(12) United States Patent
Berendse et al.

(10) Patent No.: US 6,187,876 B1
(45) Date of Patent: Feb. 13, 2001

(54) ELASTOMER COPOLYETHER ESTER COMPOSITION FOR FLEXIBLE GREASE

(75) Inventors: Henk W. Berendse, Arnhem; Béla B. Fudala, Maastricht; Ivan Vulic, Beek, all of (NL)

(73) Assignee: DSM N.V., Heerlen (NL)

( * ) Notice: Under 35 U.S.C. 154(b), the term of this patent shall be extended for 0 days.

(21) Appl. No.: 09/205,176

(22) Filed: Dec. 4, 1998

Related U.S. Application Data

(63) Continuation of application No. PCT/NL97/00304, filed on May 30, 1997.

(30) Foreign Application Priority Data

Jun. 5, 1996 (BE) .................................................. 9600499

(51) Int. Cl.[7] .................................................. C08L 67/02
(52) U.S. Cl. .............................................. 525/444; 92/47
(58) Field of Search ................................. 525/444; 92/47

(56) References Cited

U.S. PATENT DOCUMENTS 3,917,743 * 11/1975 Schroeder .............................. 524/255
4,731,407 * 3/1988 Benin .................................... 524/451

* cited by examiner

*Primary Examiner*—Patricia A. Short
(74) *Attorney, Agent, or Firm*—Pillsbury Madison & Sutro LLP

(57) ABSTRACT

The invention relates to a copolyether ester composition for products that show particularly good aging behaviour when exposed to dynamic deformation at elevated temperatures and in contact with greases. The copolyether ester composition comprises a mixture of at least 2 copolyether esters A and B, composed of hard segments derived from at least one alkylene diol and at least one aromatic dicarboxylic acid and soft segments derived from at least one polyalkylene oxide glycol and at least one aromatic dicarboxylic acid, in which the concentration of soft segments X in A and the concentration of soft segments Y in B lie between 30 and 65 wt. %, relative to the copolyether ester and the molecular weights of X and Y lie between 500 and 3000 and $|M_x - M_y| \geq 400$.

16 Claims, No Drawings

ELASTOMER COPOLYETHER ESTER COMPOSITION FOR FLEXIBLE GREASE

This is a International Appln. No. PCT/NL97/00304 filed May 30, 1997 which designated the U.S.

The invention relates to a product obtained from copolyether ester elastomers and to the copolyether ester composition required therefor.

Copolyether ester compositions are used for example there where the product made from them is exposed to frequent deformation. Very well-known applications are in this context bellows for protecting drive and transmission shafts, steering columns and suspension assemblies and sealing rings. In such applications the material also frequently or continuously comes into contact with lubricants, such as oils or greases. The resistance of the copolyether ester compositions to the effects of oils and greases is one of the reasons, alongside their simple processability in relatively complex shapes, for their wide use. The continuing miniaturisation of, among other things, the so-called CV (constant velocity) joints in automobiles has led to a demand for an improved lubricant to meet the higher requirements relating to friction and tribology. New lubricants have been developed to this end, which function well even at the higher ambient temperatures associated with the continuing development of automobiles.

However, it has now been found that, at the elevated operating temperatures, these newly developed lubricants cause much faster aging of sealing bellows made from the currently common thermoplastic elastomer compositions, as a result of which tear initiation soon occurs, followed by rapid tear propagation at bending points and premature leakage of lubricant.

The aim of the invention, then, is to provide a thermoplastic elastomer composition which, under the more severe conditions with the new lubricants, prevents premature leakage of lubricant from the products obtained therewith.

It has now been found that this aim is achieved with a copolyether ester composition comprising a mixture of at least 2 copolyether esters A and B, composed of hard segments derived from at least one alkylene glycol and at least one aromatic dicarboxylic acid and soft segments derived from at least one polyalkylene oxide glycol and at least one aromatic dicarboxylic acid, in which the concentration of soft segments X in A and the concentration of soft segments Y in B lie between 30 and 65 wt. %, relative to the copolyether ester and the molecular weight M of X and Y lies between 500 and 3000 and $|M_X - M_Y| \geq 400$.

Mixtures of copolyether esters are known from U.S. Pat. No. 4,751,132, JP-A-5905851 and JP-A-61203165. The mixture of U.S. Pat. No. 4,751,132 contains as one component a copolyether ester containing at least 75 wt. % soft segments and exhibits too low a melting point and poor mechanical properties. The copolyether ester mixture of JP-A-5905851 consists of 2 copolyether esters A and B in a weight ratio of 40–90:60–10, in which A and B contain 45–70 and 60–85 wt. % identical soft segments, respectively. This composition, too, shows the drawbacks of the composition of U.S. Pat. No. 4,751,132, though to a lesser extent.

JP-A-61203165 discloses a mixture of 2 copolyether esters A and B, of which A and B contain 10–60 wt. % soft segments and the concentration of soft segments in A is 2–20 wt. % higher than the concentration of soft segments in B. In the examples the molecular weights of the soft segments in A and B are the same. The flow properties are improved relative to those of the individual copolyether esters and the flexural fatigue behaviour lies between that of the individual copolyether esters.

It is very surprising that a greatly improved flexural fatigue behaviour is obtained with the copolyether ester composition according to the invention.

The copolyether esters of the composition according to the invention are state of the art and are described in for example "Encyclopedia of Polymer Service and Engineering", Vol. 12, pp.75–117 (1988).

Alkylene diols with 2–12 C atoms, preferably with 2–4 C atoms, can be mentioned as examples of alkylene diols. Examples of aromatic dicarboxylic acids are phthalic acids, preferably terephthalic acid, naphthalene dicarboxylic acids and diphenyldicarboxylic acids. Preferably the dicarboxylic acid is terephthalic acid or a mixture of tere- and isophthalic acid in a molar ratio of at least 80:20, naphthalene dicarboxylic acid or 4,4'-diphenyldicarboxylic acid or a mixture of 4,4'-diphenyldicarboxylic acid and terephthalic acid. The molecular weight of the hard segments may vary within a wide range, for example between 400 and 4000, preferably between 600 and 2500.

The poly(alkylene oxide) glycol is for example poly (propylene oxide) glycol. Poly(butylene oxide) glycol is preferable. The molecular weight of the poly(alkylene oxide) glycol segments lies between 500 and 3000, preferably between 600 and 2500. The molecular weights of the poly(alkylene oxide) glycol segments of copolyether esters A and B differ by at least 400, preferably by at least 500, even more preferably by at least 750.

The concentrations of soft segments in A and B generally lie between 30 and 65 wt. %, preferably between 35 and 60 wt. %, even more preferably between 40 and 60 wt. %. Preferably the concentrations of soft segments X and Y in A and B, respectively, are chosen so that the number average molecular weights of the hard segments in A and B differ by not more than a factor of 5, preferably by not more than a factor of 3. Even more preferably the number average molecular weights of the hard segments in A and B are almost the same.

The A:B weight ratio may vary within a wide range, for example between 0.1 and 10, preferably between 0.25 and 4, even more preferably between 0.5 and 2.

In aging processes it has most surprisingly been found that delamination took place in the aged samples of the invention. This effect is indicative of the presence of two unmixed phases. According to the inventors this explains the superior behaviour of the composition according to the invention.

For this reason the present invention also covers a copolyether ester composition comprising at least 2 copolyether esters A and B that are at least partly unmixed. The partly unmixed condition may be caused by A and B being incompatible even under very intensive stirring conditions. On the other hand, complete mixing may be deliberately prevented, for example by choosing copolyether esters A and B with viscosities that differ only little from one another or by choosing very mild stirring conditions, or by choosing both.

It is incidentally also possible to control the viscosities of A and B by incorporating a multifunctional compound; a well-known example of such a multifunctional compound that ensures a controlled degree of crosslinking is trismethylolpropane (TMP), which is used in a concentration of between 0.05 and 5.0 wt. %, preferably 0.05 and 3.0 wt. %, relative to the polyether ester, or by incorporating a diisocyanate, which causes chain lengthening.

In the last case the copolyether esters concerned may in principle be completely miscible, but A and B are deliberately mixed in co-continuous phases in the composition.

In addition, the invention also covers products obtained with a composition according to the invention.

The invention also covers the use of this product under conditions of dynamic deformation in flexure.

Particularly advantageous is the use under dynamic deformation in the case of contact with oils and greases at elevated temperatures. The greatest advantage over the products according to the state of the art is obtained at temperatures of at least 125° C.

The composition according to the invention preferably also contains 0.05–2 wt. %, preferably 0.1–1.5 wt. %, of an oxidation stabiliser, for example sterically hindered phenolic or secondary amines. Very suitable are polyphenols containing amide.

The composition according to the invention may also contain the usual fillers, preferably in minor amounts, i.e. less than 50 wt. %, even more preferably less than 35 wt. %, most preferably less than 25 wt. %, of the composition including the fillers. Examples of fillers are carbon black, talcum, clay, colorants. If so desired, other additives may also be present in effective amounts, for example additives with a flame-retarding effect such as melamine, melam and melamine compounds, for example melamine cyanurate or melamine phosphate, halogenated compounds, for example polybromostyrene, and auxiliaries for processing, for example mould release agents. If so desired, these additives may be present in different concentrations in the at least 2 copolyether esters; optionally an additive may be present in only one of the components A and B. Preferably both A and B contain the antioxidant.

The composition according to the invention can be obtained from the constituent components using the usual equipment for the melt mixing of thermoplastic polymers. Examples of the same equipment are: kneaders, extruders and mixing rolls. The melt mixing is preferably preceded by solid-phase mixing of components A and B, which will usually be present in granular form, and optionally the additives. Preferably, the mixing takes place under mild conditions, i.e. the occurring shear forces are preferably kept low. The melt mixing preferably takes place with exclusion of oxygen and water.

The products according to the invention are obtained via forming from the melt. Preferably use is then made of injection-moulding or blow-extrusion techniques. For blow extrusion the viscosity of the composition is optionally increased through solid-state post-condensation. Injection-moulding is most preferable, in the case of complex forms optionally followed by the welding of two or more injection-moulded parts into a whole.

The invention will now be elucidated with reference to the following examples and comparative experiments, without however being limited thereto.

Grease Aging

Test rods made from the compositions were subjected to grease aging tests by immersing the rods in a beaker containing grease, which was placed in an air-circulating oven.

At certain times, a number of rods were removed from the grease, cleaned by rinsing with iso-octane for approx. 30 seconds and, after they had been rubbed with tissue paper, subjected to a static and a dynamic loading test. The amount of grease absorbed was also determined. The test rods were obtained via injection-moulding using an Arburg 9 injection-moulding machine, after all the materials had been dried for 4 hours at 140° C. The injection-moulding conditions were: mould temperature 50° C.; barrel temperature 200–220° C., maximum pressure; cycle time 40 sec.

Static Loading Test

The tensile strength and elongation at break were determined at 23° C. according to ISO R 527. The values stated are all the averages of at least 3 (ISO S 2) test rods.

Dynamic Loading Test

So-called "De Mattia" test rods with a length of 120 mm (ISO 132-1983-(E)), were clamped and loaded at a frequency of 5 Hz. The loading was based on flexure, the entire test rod being folded over with a predefined geometric narrowing (circular groove) serving as the centre.

Greases Used

Molykote VN2461C from Dow Corning Europe: a grease based predominantly on lithium soap grease also containing molybdenum sulphide and having a maximum service temperature of 130° C.

Berutox GKN HTBJ® from Carl Bechem GMBH, Germany: based on polyurea grease and containing mineral/synthetic basic oil and molybdenum sulphide and having a maximum service temperature of 160° C.

Copolyether Esters A and B

These were prepared by combining in an autoclave and heating until polymerisation strarted:

TABLE 1

|  | A | B |
|---|---|---|
| dimethyl terephthalate | 16.9 kg | 25.2 kg |
| 1,4 butanediol | 12.05 kg | 17.4 kg |
| PTHF 1000 |  | 18.4 kg |
| PTHF 2000 | 27.0 kg |  |
| trimethylolpropene | 50.8 g | 75.6 g |
| tetrabutyl titanate | 423 g | 454 g |
| (5 wt. % in butanediol |  |  |
| Irganox 1330 ® | 225 g | 225 g |

The polycondensation was continued for about 3 hours while stirring the reactor contents until the stirrer reached a constant turning moment at 30 revolutions per minute. The final temperature of the polycondensation was 242.7±1.2° C. The relative viscosities, $\eta_{rel}$, of A and B in m-cresol were 2.16 and 2.58, respectively, the melt temperatures were 191.3 and 190.4° C., respectively.

Copolyester C

Hytrel 8105® from Du Pont de Nemours, Lux., a copolyether ester based on pTHF1400, and polybutylene terephthalate/isophthalate copolyester as the hard segment with MDI as the chain-lengthening agent. The Shore hardness was 42D. The relative viscosity was 4.20. Recommended for blow moulding in bellows and other applications.

EXAMPLE I AND COMPARATIVE EXAMPLES A–C

Copolyether esters A and B were mixed in a 50/50 weight ratio using the single-screw extruder as described above and 1.0 wt. % Naugard 445® and 0.5 wt. % Rewopan IM-OA® was added for the stabilisation. (All the compositions contained carbon black that was added via a masterbatch).

The extruded granules obtained were dried for about 2 hours at 140° C. in a tumble-drier under a vacuum and then subjected to post-condensation at 180° C., until a relative viscosity of at least 3.70 was obtained. The Shore D hardness of these A/B 50/50 compositions was 40.

Copolyether ester A was mixed with polybutylene terephthalate in a weight ratio of 83.3/16.7, into a composition D with a shore D hardness of 38 and was brought to a relative viscosity of 3.80 through post-condensation.

Test rods for the aging tests were injection-moulded from the various compositions and copolyether esters. Table 3 presents the results of the tests.

The effect of 14 days' exposure in the different greases at 125° C. on the dynamic fatigue behaviour is indicated for the different materials. A number of visual qualifications is given for the characterisation of the aging under dynamic loading.

Explanation of Abbreviations and Trade Names

PTHF stands for polytetrahydrofuran.

1000 and 2000 indicate the molecular weights of the PTHF.

MDI is 4,4'-methylenediphenyldiisocyanate.

Naugard 445® is an aromatic amine produced by Uniroyal Chemical.

Rewopon IM-OA® is a di-substituted imidazoline antioxidation co-stabiliser produced by Rewo.

Vulcanox DDA® is an aromatic amine heat stabiliser produced by Bayer.

Irganox 1330® is a sterically hindered phenol produced by Ciba-Geigy.

revolutions per minute, and the moment of the bellows' failure was determined. In the automotive industry a life of 350 hours under these conditions is generally considered satisfactory.

The results are presented in Table 3.

TABLE 3

| Material | Molykote VN 2461 C | GKN HTBJ |
|---|---|---|
| A/B (Example II) | 350–450 hours | 350–400 hours |
| C Comp. Ex. D | 350–400 hours | 100–150 hours |
| D Comp. Ex. E | 350–400 hours | 150–250 hours |

In this practical test, too, in which the bellows had to endure at least $30.10^6$ cross-sectional deformations, the bellows obtained from the composition according to the invention were found to be superior to those according to the state of the art.

What is claimed is:

1. Copolyether ester composition comprising a mixture of at least 2 copolyether esters A and B, composed of hard segments derived from at least one alkylene diol and at least one aromatic dicarboxylic acid and soft segments derived from at least one polyalkylene oxide glycol and at least one aromatic dicarboxylic acid, in which the concentration of soft segments X in A and the concentration of soft segments Y in B lie between 30 and 65 wt. %, relative to the copolyether ester and the molecular weights of X and Y lie between 500 and 3000 and $|M_x - M_y| \geq 400$.

2. Copolyether ester composition according to claim 1, characterised in that the weight ratio of A and B in the composition lies between 0.1 and 10.

3. Copolyether ester composition according to claim 2, characterised in that the weight ratio of A and B in the composition lies between 0.25 and 4.

4. Copolyether ester composition according to claim 3, characterised in that the weight ratio of A and B in the composition lies between 0.5 and 2.

5. Copolyether ester composition according to claim 1, characterised in that the concentrations of soft segments X and Y in copolyether esters A and B, respectively, are chosen so that the number average molecular weights of the hard segments in A and B do not differ by more than a factor of 5.

TABLE 2

| Copolyether ester (composition) | B | C | A/B | D | B | C | A/B | D | C | A/B | D |
|---|---|---|---|---|---|---|---|---|---|---|---|
| type of grease | | none | | | | Molykote VN 2461 C | | | | Berutox HTBJ | |
| number of cycles: | | | | | | | | | | | |
| 1,000 | | N | N | N | | N | N | VD/VC | VC | FC | VD/CWW | FC |
| 10,000 | | S-DS | N | N | CWW | | | CWW | CWW | | VD/CWW | |
| 50,000 | | | N | S-DS | CWW/C | VD | VC | CWW/W | CWW/W | | CWW | |
| 100,000 | | | N | VD | CWW/C | CWW | CWW/70 | CWW/C | CWW/W | | CWW/W | |
| 175,000 | | | N | VD | CWW/C | FC | CWW/90 | CWW/W | CWW/W | | | |
| 250,000 | CWW | | | | | | | | | | |
| 500,000 | CWW | | | | | | | | | | |
| 750,000 | CWW/W | | | | | | | | | | |
| 1,000,000 | CWW/W | N | CWW | CWW/W | | FC | CWW | CWW/W | | CWW/FC | |

N = no visual degradation of the sample
CWW = breakage over 100% of the sample's width
S-DS = signs of imminent delamination
FC = complete breakage
VD = visible delamination
/C = constant relative to previous measurement
VC = visible breakage
/W = decline relative to previous measurement
/70 = breakage over 70% of the width The results in Table 2 indicate that composition A/B according to the invention (Example I) shows better long-term fatigue behaviour after contact with the grease than composition D and the unmixed copolyether esters B and C (Comparative Experiments A–C). This in spite of the fact that, in for example Molykote VN 2461C, the composition according to the invention showed some attack already after 1,000 hours, whereas the unmixed copolyether esters did not.

EXAMPLE II AND COMPARATIVE EXAMPLES D AND E

Compositions A/B and D and copolyether ester C were used to produce bellows by means of blow moulding, which bellows were subjected to an accelerated endurance test under practical conditions.

To this end the bellows were mounted over a CVT joint (constant velocity transmission joint) and the drive shaft was set at an angle of 21.50°.

The bellows were filled with the grease concerned, after which the shaft was driven at 100° C., at a speed of 1500

6. Copolyether ester composition according to claim 5, characterised in that the number average molecular weights of the hard segments in A and B do not differ by more than a factor of 3.

7. Copolyether ester composition according to claim 6, characterised in that the number average molecular weights of the hard segments in A and B are about the same.

8. A product comprising the composition according to any one of claims 1–7.

9. An automotive bellow comprising the composition of claim 1.

10. A copolyether ester composition comprising a mixture of at least 2 copolyether esters A and B, wherein each of said copolyether ester A and B is composed of (i) hard segments derived from at least one alkylene diol and at least one aromatic dicarboxylic acid and (ii) soft segments derived from at least one polyalkylene oxide glycol and at least one aromatic dicarboxylic acid, in which the concentrations of soft segments in each of said copolyether esters A and B is between 30 and 65 wt. % relative to the copolyether ester and the molecular weights of the soft segments are between 500 and 3000, wherein the composition is obtained via melt mixing, and wherein the copolyether esters A and B are at least partly unmixed.

11. A product comprising the composition of claim 10.

12. An automotive bellow comprising the composition of claim 10.

13. A method of preventing premature leakage of lubricant from a product under conditions of dynamic deformation in flexure comprising:

forming the product from a melt of a composition comprising a mixture of at least 2 copolyether esters A and B, wherein each of said copolyether ester A and B is composed of (i) hard segments derived from at least one alkylene diol and at least one aromatic dicarboxylic acid and (ii) soft segments derived from at least one polyalkylene oxide glycol and at least one aromatic dicarboxylic acid, in which the concentrations of soft segments in each of said copolyether esters A and B is between 30 and 65 wt. % relative to the copolyether ester and the molecular weights of the soft segments are between 500 and 3000.

14. The method according to claim 13, wherein the product is in contact with oils and greases.

15. The method according to claim 14, wherein the oils and greases are at a temperature of at least 125° C.

16. A method of preventing premature leakage of lubricant from a product under conditions of dynamic deformation in flexure comprising:

forming the product from a melt of a composition comprising a mixture of at least 2 copolyether esters A and B, composed of hard segments derived from at least one alkylene diol and at least one aromatic dicarboxylic acid and soft segments derived from at least one polyalkylene oxide glycol and at least one aromatic dicarboxylic acid, in which the concentrations of soft segments X in A and soft segments Y in B lie between 30 and 65 wt. % relative to the copolyether ester and the molecular weights of X and Y lie between 500 and 3000 and $|M_x-MY|\geq 400$.

* * * * *